(12) United States Patent
Kato et al.

(10) Patent No.: US 8,026,336 B2
(45) Date of Patent: Sep. 27, 2011

(54) POLYCARBONATE RESIN COMPOSITION AND METHOD OF PRODUCING THE SAME

(75) Inventors: Noriyuki Kato, Tokyo (JP); Yoshinori Isahaya, Tokyo (JP); Shu Yoshida, Tokyo (JP); Jun Hagiwara, Tokyo (JP); Kazuaki Kaneko, Tokyo (JP); Keiichi Kameyama, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 12/706,550

(22) Filed: Feb. 16, 2010

(65) Prior Publication Data

US 2010/0210811 A1  Aug. 19, 2010

(30) Foreign Application Priority Data

Feb. 17, 2009  (JP) ................. 2009-033852

(51) Int. Cl.
*C08G 64/00* (2006.01)
*C08G 63/02* (2006.01)

(52) U.S. Cl. ........ 528/196; 264/219; 359/642; 528/198; 528/481

(58) Field of Classification Search .......... 264/219; 359/642; 528/196, 198, 481
See application file for complete search history.

(56) References Cited

U.S. PATENT DOCUMENTS 6,448,365 B1 * 9/2002 Funakoshi et al. ............ 528/196
2002/0190437 A1 * 12/2002 Funakoshi et al. ............ 264/484

FOREIGN PATENT DOCUMENTS

| | | |
|---|---|---|
| EP | 2 034 337 A1 | 3/2009 |
| JP | 06-025398 A | 2/1994 |
| JP | 07-109342 A | 4/1995 |
| JP | 10-101786 A | 4/1998 |
| JP | 10-101787 A | 4/1998 |
| JP | 2000-169573 A | 6/2000 |
| JP | 2007-057916 A | 3/2007 |
| WO | 2007/142149 A1 | 12/2007 |

* cited by examiner

*Primary Examiner* — Terressa Boykin
(74) *Attorney, Agent, or Firm* — Sughrue Mion, PLLC

(57) ABSTRACT

The present invention relates to a polycarbonate resin composition which comprises a polycarbonate resin having the repeating unit that is represented by the following general formula (1) and a hydroxyl group at terminal thereof and has the concentration of the terminal hydroxyl group of 1000 ppm or more.

14 Claims, No Drawings

POLYCARBONATE RESIN COMPOSITION AND METHOD OF PRODUCING THE SAME

BACKGROUND OF THE INVENTION

1. Field of the Invention

The present invention relates to a polycarbonate resin composition comprising a polycarbonate resin with a specific structure and a method of producing the same. Specifically, the present invention relates to a polycarbonate resin composition comprising a polycarbonate resin with a specific structure so that it is appropriate as an optical material having high transparency, high resistance to heat, high refractive index and low birefringence, and a method of producing the same.

2. Description of the Related Art

A polycarbonate resin which is obtained by reacting 2,2-bis(4-hydroxyphenyl)propane (common name: bisphenol A) with phosgene or carbonic acid diester has an excellent resistance to heat and excellent transparency. In addition, as having an excellent mechanical property such as impact resistance, etc., it is widely used not only as a structural material but also as an optical material like a plastic optical product including various lenses, prisms, optical disc substrates, optical fibers and the like and an optical film.

However, since the conventional aromatic polycarbonate resins are a material having high optical elasticity and low fluidity, it has a problem that birefringence is high due to molecular orientation during molding and residual stress. Thus, when an optical material consisting of conventional aromatic polycarbonate resin is molded, a method of using a resin with relatively low molecular weight to improve fluidity and molding at high temperature to reduce birefringence of a product has been used. However, with the conventional aromatic polycarbonate resins, birefringence can be only limitedly reduced even when such method is employed. Thus, in accordance with enlarged use of an optical material in recent days, development of a material which has even lower optical elasticity coefficient and high fluidity has been really waited for in several optical material fields. In this connection, development of a resin having even smaller birefringence has been carried out.

Meanwhile, if an optical material has high refractive index, even smaller curvature of the surface of a lens element can be achieved. As a result, aberration amount occurring on the surface can be reduced and small scale and lightweight production of a lens system can be achieved based on reduction in the number of lenses, reduction in the eccentric sensitivity of a lens and reduction in the thickness of a lens. In addition, an eyeglass lens can provide excellent appearance as thinning of a lens with the same power of eyeglasses can be achieved.

Thus, development of an optical resin having high refractive index and low birefringence has been carried out, and as such optical resin having high refractive index and low birefringence, a wholly aromatic polycarbonate resin copolymer using bisphenols with a fluorene structure has been studied (see, Patent Document Nos. 1 and 2 below).

Further, a homopolycarbonate resin of ether diols having a phenol skeleton and a fluorene structure, or a copolymer of such resins and bisphenols is disclosed (see, Patent Document Nos. 3 and 4 below).

Still further, a copolymer of bisphenols having a fluorene structure and tricyclodecane[$5.2.1.0^{2,6}$]dimethanol is also suggested (see, Patent Document No. 5 below).

[Patent Document No. 1] Japanese Patent Application Laid-Open (JP-A) No. 6-25398
[Patent Document No. 2] JP-A No. 7-109342
[Patent Document No. 3] JP-A No. 10-101787
[Patent Document No. 4] JP-A No. 10-101786
[Patent Document No. 5] JP-A No. 2000-169573

BRIEF SUMMARY OF THE INVENTION

However, the polycarbonate resins disclosed in the above Patent Document Nos. 1 to 5 are not yet completely satisfying in every aspect including transparency, resistance to heat, refractive index and birefringence, and thus have a possibility for further improvement.

The present invention is to solve the problems described above, and has an object of providing a polycarbonate resin composition having high refractive index, high resistance to heat, low birefringence and high transparency and a method of producing the same.

In order to solve the problems described above, inventors of the present invention first focused on a polycarbonate resin having a hydroxyl group at terminal thereof. Since this polycarbonate resin has a problem of low hydrolysis stability, as disclosed in Patent Document Nos. 3 and 4, for example, its concentration is generally required to be zero by using a terminal sealing agent. However, based on the idea that this terminal hydroxyl group can form a hydrogen bond to give high Tg and also may have a favorable effect on other physical properties, the inventors of the present invention conducted an intensive research. As a result, it was found that, with a polycarbonate resin composition which comprises a polycarbonate resin having a repeating unit that is represented by the following general formula (1) and a hydroxyl group at terminal thereof and has the terminal hydroxyl group within a specific concentration range, high refractive index, high resistance to heat, low birefringence and high transparency can be obtained, and therefore the present invention was completed.

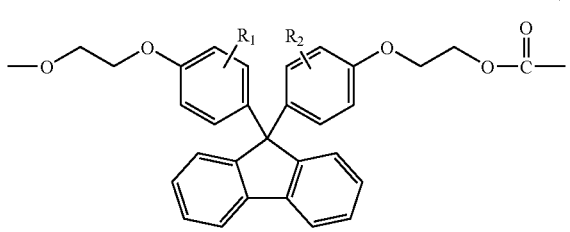

(1)

(wherein, $R_1$ and $R_2$ each independently represent a hydrogen atom or a methyl group)

Specifically, the present invention relates to a polycarbonate resin composition which comprises a polycarbonate resin having the repeating unit that is represented by the following general formula (1) and has the concentration of the terminal hydroxyl group of 1000 ppm or more.

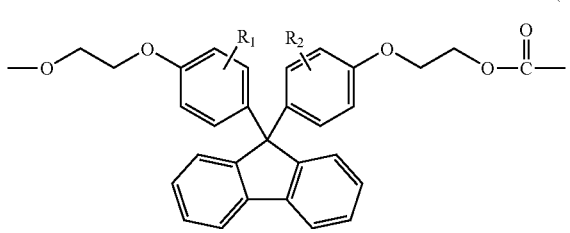

(1)

(wherein, $R_1$ and $R_2$ each independently represent a hydrogen atom or a methyl group)

In the polycarbonate resin composition described above, weight average molecular weight of the polycarbonate resin described above is preferably from 6000 to 100,000.

In addition, the present invention relates to a method of producing polycarbonate resin composition in which molar incorporation ratio of a carbonic acid ester compound relative to a dihydroxy compound is less than 1.02 when the dihydroxy compound represented by the following general formula (2) and the carbonic acid ester compound are subjected to melt polycondensation in the presence of a basic compound catalyst and an ester exchange catalyst or only one of them.

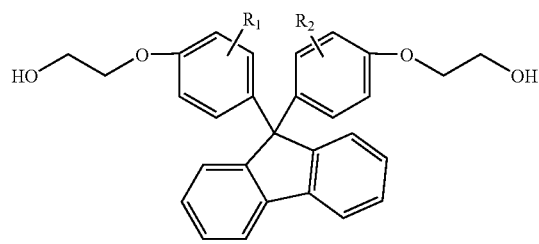

(2)

(wherein, $R_1$ and $R_2$ each independently represent a hydrogen atom or a methyl group)

According to the present invention, a polycarbonate resin composition having high refractive index, high resistance to heat, low birefringence and high transparency and a method of producing the same are provided.

DETAILED DESCRIPTION OF THE INVENTION

The polycarbonate resin composition of the present invention is characterized in that it comprises a polycarbonate resin having a repeating unit that is represented by the following general formula (1) and a hydroxyl group at terminal thereof and has a hydroxyl group at the terminal of all or most of the polycarbonate resin. That is, in the polycarbonate resin composition of the present invention, concentration of the terminal hydroxyl group is 1000 ppm or more.

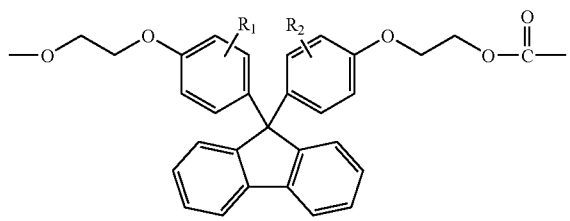

(1)

(wherein, $R_1$ and $R_2$ each independently represent a hydrogen atom or a methyl group)

In a method of producing this polycarbonate resin, a known melt polycondensation in which a dihydroxy compound and a carbonic acid diester compound are reacted in the presence of a basic compound catalyst or an ester exchange catalyst or a mixture catalyst consisting of both is suitably employed.

Specifically, the polycarbonate resin composition of the present invention can be obtained by having the molar reaction ratio of the carbonic acid ester compound lower than the dihydroxy compound when the carbonic acid diester compound and the dihydroxy compound represented by the following general formula (2) are subjected to melt polycondensation.

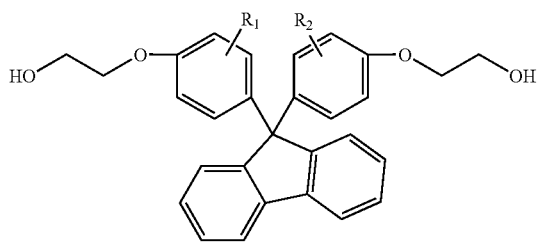

(2)

(wherein, $R_1$ and $R_2$ each independently represent a hydrogen atom or a methyl group)

As the dihydroxy compound represented by the general formula (2) described above, 9,9-bis(4-(2-hydroxyethoxy)phenyl)fluorene, 9,9-bis(4-(2-hydroxyethoxy)-3-methylphenyl)fluorene, and 9,9-bis(4-(2-hydroxyethoxy)-3,5-dimethylphenyl)fluorene are specifically exemplified. Among these, 9,9-bis(4-(2-hydroxyethoxy)phenyl)fluorene is suitably used, in particular.

Herein, two or more kinds of the dihydroxy compound that is represented by the general formula (2) above can be used. In addition, although the polycarbonate resin composition of the present invention is characterized in that it comprises a polycarbonate resin having the general formula (1) as a main repeating unit, the polycarbonate resin may comprise one or more other repeating unit at a ratio of 20 mole % or less, or preferably 15 mole % or less. In order to introduce such repeating unit to the polycarbonate resin, for example, aliphatic diols such as tricyclo(5.2.1.0$^{2,6}$)decane dimethanol, 1,4-cyclohexane dimethanol, 3,9-bis(2-hydroxy-1,1-dimethylethyl)-2,4,8,10-tetraoxaspiro(5.5)undecane and isosorbide or aromatic diols such as 2,2-bis(4-hydroxyphenyl)propane, or dicarboxylic acid such as terephthalic acid, isophthalic acid and naphthalene dicarboxylic acid or their ester can be co-polymerized with the dihydroxy compound that is represented by the general formula (2) described above.

The carbonic acid diester compound can include diphenyl carbonate, ditryl carbonate, bis(chlorophenyl) carbonate, m-cresyl carbonate, dimethyl carbonate, diethyl carbonate, dibutyl carbonate, dicyclohexyl carbonate and the like. Among these, diphenyl carbonate is preferred, in particular. Diphenyl carbonate is preferably used at a ratio of 0.9999 to 0.9000 mole compared to total one mole of the dihydroxy compound. More preferably, it is used at a ratio of 0.9990 to 0.9200, and still more preferably at a ratio of 0.9900 to 0.9400.

The basic compound catalyst can include an alkali metal compound and/or an alkaline earth metal compound, a nitrogen-containing compound and the like, in particular. These compounds can be used alone or in combination thereof.

As the alkali metal compound, an organic acid salt, an inorganic salt, an oxide, a hydroxide, a hydride or an alkoxide of an alkali metal can be used, for example. Specifically, sodium hydroxide, potassium hydroxide, cesium hydroxide, lithium hydroxide, sodium hydrocarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, phenylated boron sodium, sodium benzoate, potassium benzoate, cesium benzoate, lithium benzoate, disodium hydrophosphate, dipotassium hydrogenphosphate, dilithium hydrophosphate, disodium phenylphosphate, disodium salt, dipotassium salt, dicesium salt or dilithium salt of bisphenol A, sodium salt, potassium salt, cesium salt or lithium slat of phenol and the like can be used.

As the alkaline earth metal compound, an organic acid salt, an inorganic salt, an oxide, a hydroxide, a hydride or an alkoxide of an alkaline earth metal can be used, for example. Specifically, magnesium hydroxide, calcium hydroxide, strontium hydroxide, barium hydroxide, magnesium hydrocarbonate, calcium hydrocarbonate, strontium hydrocarbonate, barium hydrocarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate and the like can be used.

As the nitrogen-containing compound, quaternary ammonium hydroxide and salts thereof, amines and the like are preferably used. Specifically, quaternary ammonium hydroxides having an alkyl, an aryl group and the like including tetramethylammonium hydroxide, tetraethylammonium hydroxide, tetrapropylammonium hydroxide, tetrabutylammonium hydroxide, trimethylbenzylammonium hydroxide and the like, tertiary amines including triethylamine, dimethylbenzylamine, triphenylamine and the like, secondary amines including diethylamine, dibutylamine and the like, primary amines including propylamine, butylamine and the like, imidazoles including 2-methylimidazole, 2-phenylimidazole, benzimidazole and the like, or a base or a basic salt such as ammonia, tetramethylammonium borohydride, tetrabutylammonium borohydride, tetrabutylammonium tetraphenylborate, tetraphenylammonium tetraphenylborate and the like can be used.

As the ester exchange catalyst, salts of zinc, tin, zirconium or lead are preferably used. These compounds can be used alone or in combination thereof.

As the specific example of the ester exchange catalyst, zinc acetate, zinc benzoate, zinc 2-ethylhexanoate, tin chloride (II), tin chloride (IV), tin acetate (II), tin acetate (IV), dibutyl tin dilaurate, dibutyl tin oxide, dibutyl tin dimethoxide, zirconium acetylacetonate, zirconium oxyacetate, zirconium tetrabutoxide, lead acetate (II), lead acetate (IV) and the like can be used.

These catalysts are used at a ratio of $10^{-9}$ to $10^{-3}$ mole, or preferably at a ratio of $10^{-7}$ to $10^{-4}$ mole, compared to total one mole of the dihydroxy compound.

When the carbonic acid diester compound and the dihydroxy compound that is represented by the general formula (2) described above are subjected to melt polycondensation, the molar reaction ratio of the carbonic acid diester compound should be less than the dihydroxy compound, as it is described in detail in the above. To achieve this, the molar incorporation ratio of the carbonic acid ester compound relative to the dihydroxy compound should be less than 1.02, considering the amount that is distilled out of the system with the monool (for example, phenol) during the reaction. The molar incorporation ratio of the carbonic acid ester compound is preferably 0.90 to 1.01, and more preferably 0.94 to 1.00. When the molar incorporation ratio of the carbonic acid ester compound is less than 0.90, there is tendency that a desired molecular weight cannot be obtained as the reaction rate is decreased. On the other hand, when it is more than 1.00, terminal OH is reduced and at the same time melt viscosity becomes too high as the molar reaction ratio becomes close to 1.0, and as a result, molding can be difficult to achieve.

The melt polycondensation according to the present invention is to carry out melt polycondensation under heating condition using the raw materials and the catalyst described above and removing byproducts according to ester exchange reaction under normal or reduced pressure. The reaction is generally carried out with a process including multiple steps like two or more steps.

Specifically, the first step reaction is carried out at the temperature of 120 to 220° C., or preferably 160 to 200° C., for 0.1 to 5 hours, or preferably 0.5 to 3 hours, under normal pressure to 26664.5 Pa. Subsequently, over 1 to 3 hours, while gradually increasing the temperature to the final temperature of 230 to 260° C., the pressure is gradually reduced to the final pressure of 133.3 Pa or less and the reaction is continued. Finally, polycondensation reaction is carried out under reduced pressure of 133.3 Pa or less at the temperature of 230 to 260° C. When pre-determined viscosity is obtained, the pressure is restored by using nitrogen and the reaction is terminated. The reaction time under 133.3 Pa or less is 0.1 to 2 hours and the total reaction time is 1 to 6 hours, and generally 2 to 5 hours.

The reaction can be carried out in a continuous mode or a batch mode. The reaction apparatus that can be used for implementing the reaction described above can be a vertical type equipped with anchor type stirring blade, max blend stirring blade, helical ribbon type stirring blade and the like, a lateral type equipped with paddle blade, lattice blade, eyeglass blade and the like, or an extrusion type equipped with screw. Further, considering the viscosity of the polymerization product, use of a reaction apparatus having an appropriate combination of said apparatuses can be suitably employed.

After the termination of polymerization reaction, in order to maintain heat stability and hydrolysis stability, the catalyst is either removed or deactivated. In general, a method by which the catalyst is deactivated by adding a known heat stabilizer and hydrolysis stabilizer is suitably carried out. As such materials, an acidic material is generally used. Specifically, aromatic sulfonates such as p-toluene sulfonic acid and the like, aromatic sulfonate esters such as butyl p-toluene sulfonate, hexyl p-toluene sulfonate and the like, aromatic sulfonate salts such as dodecyl benzene sulfonate tetrabutyl phosphonium salt and the like, organic halogenates such as stearyl chloride, benzoyl chloride, p-toluene sulfonyl chloride and the like, alkyl sulfates such as dimethyl sulfate and the like, and organic halogenides such as benzyl chloride and the like can be suitably used.

After the deactivation of the catalyst, a process of removing low-boiling compounds included in the polymer based on volatilization under the pressure of 13.3 to 133.3 Pa and the temperature of 200 to 350° C. can be carried out. In order to achieve this, a lateral type apparatus that is equipped with a stirring blade such as paddle blade, lattice blade, eyeglass blade and the like having excellent surface renewing property, or a thin film evaporator can be suitably used.

Further, to the polycarbonate resin obtained, in addition to the heat stabilizer and the hydrolysis stabilizer described in the above, an antioxidant, a pigment, a dye, a reinforcing agent or a filling agent, a UV absorbing agent, a lubricating agent, a releasing agent, a crystal nucleating agent, a plasticizer, an agent for improving fluidity, an antistatic agent, an antimicrobial agent and the like can be also added.

In the polycarbonate resin composition which can be obtained according to the above, concentration of the terminal hydroxyl group is 1000 ppm or more. However, it is preferable that the concentration of the terminal hydroxyl group is 5000 ppm or less. Although it is still favorable in terms of transparency, resistance to heat, refractive index and birefringence even when the concentration of the terminal hydroxyl group is more than 5000 ppm, there is tendency that the molecular weight becomes smaller and as a result the strength is lowered. Thus, it is preferable that the concentration of the terminal hydroxyl group is from 1000 to 4000 ppm.

The weight average molecular weight (Mw) of the polycarbonate resin composition of the present invention in terms of polystyrene is preferably 6,000 to 100,000, more preferably 8,000 to 80,000, or still more preferably 10,000 to 40,000. Mw of less than 6,000 is not desirable as being brittle. On the other hand, when Mw is more than 100,000, melt viscosity is so high that a strict condition is required for injection molding of the resin composition and silvering (silver streak) occurs on a mold product, and therefore undesirable.

EXAMPLES

Herein below, the present invention is explained in view of the Examples. However, the present invention is not limited by these Examples.

Example 1

9,9-Bis(4-(2-hydroxyethoxy)phenyl)fluorene 21.15 kg (48.23 moles), diphenyl carbonate 9.763 kg (45.58 moles) and sodium hydrocarbonate 0.0475 g ($5.65 \times 10^{-4}$ moles) were added to a 50-liter reaction vessel equipped with a stirrer and a distillation apparatus, followed by stirring under heating at 215° C. for 1 hour under 101325 Pa nitrogen atmosphere condition. After that, the reduced pressure was adjusted to 19998.3 Pa over 15 minutes and then the reaction was maintained at 215° C. for 20 minutes under 19998.3 Pa condition to carry out the ester exchange reaction. Further, the temperature was increased to 240° C. with rate of 37.5° C./hr, and then maintained at 240° C. for 10 minutes under 19998.3 Pa. After that, the pressure was adjusted to 15998.7 Pa over 10 minutes, and then maintained at 240° C. for 70 minutes under 15998.7 Pa. After that, the pressure was adjusted to 13332.2 Pa over 10 minutes, and then maintained at 240° C. for 10 minutes under 13332.2 Pa. Further, after achieving 133.3 Pa or less over 40 minutes, the polymerization reaction was carried out under stirring at 240° C. for 10 minutes under the condition of 133.3 Pa or less. Upon the completion of the reaction, the reaction vessel was purged with nitrogen and the pressure was applied to the pace of the reaction vessel to pelletize and recover the polycarbonate resin produced.

10.0 kg of this polycarbonate resin was dried under vacuum for 24 hours at 100° C. After that, Irganox 1010 manufactured by Ciba Specialty Chemicals and Poem M300 manufactured by Riken Vitamin, Co., Ltd. were added in an amount of 500 ppm and 500 ppm, respectively, to the polycarbonate resin, followed by kneading using an extruder at 260° C. for pelletization. As a result, pellets of the polycarbonate resin composition were obtained.

Example 2

Pellets of the polycarbonate resin composition were obtained in the same manner as Example 1 except that 9,9-bis(4-(2-hydroxyethoxy)phenyl)fluorene 21.48 kg (49.04 moles), diphenyl carbonate 11.76 kg (54.9 moles), 2,2-bis(4-hydroxyphenyl)propane 1.976 kg (8.66 moles) and sodium hydrocarbonate 0.0538 g ($6.40 \times 10^{-4}$ moles) were added to a 50-liter reaction vessel equipped with a stirrer and a distillation apparatus.

Example 3

Pellets of the polycarbonate resin composition were obtained in the same manner as Example 1 except that 9,9-bis(4-(2-hydroxyethoxy)phenyl)fluorene 21.23 kg (48.41 moles), diphenyl carbonate 10.20 kg (47.60 moles) and sodium hydrocarbonate 0.0484 g ($5.761 \times 10^{-4}$ moles) were added to a 50-liter reaction vessel equipped with a stirrer and a distillation apparatus.

Comparative Example 1

Pellets of the polycarbonate resin composition were obtained in the same manner as Example 1 except that 9,9-bis(4-(2-hydroxyethoxy)phenyl)fluorene 21.49 kg (49.06 moles), diphenyl carbonate 12.96 kg (60.50 moles), 2,2-bis (4-hydroxyphenyl)propane 1.977 kg (8.66 moles) and sodium hydrocarbonate 0.0567 g ($6.75 \times 10^{-4}$ moles) were added to a 50-liter reaction vessel equipped with a stirrer and a distillation apparatus.

Comparative Example 2

Pellets of the polycarbonate resin composition were obtained in the same manner as Example 1 except that bisphenol A 17.221 kg (79.5 moles), diphenyl carbonate 17.031 kg (75.4 moles) and sodium hydrocarbonate 0.0538 g ($6.40 \times 10^{-4}$ moles) were added to a 50-liter reaction vessel equipped with a stirrer and a distillation apparatus.

[Evaluation of Physical Properties of the Polycarbonate Resin Composition]

As for the pellets of Example 1 to 3 and Comparative example 1 and 2, which had been obtained from the above, terminal OH group concentration, molecular weight Mw, refractive index, glass transition temperature (Tg), birefringence, total light transmittance ratio and MFR (Melt Flow Rate) were measured. The results are summarized in the Table 1. In addition, the measurement was carried out as described below.

1) Concentration of Terminal OH Group:

First, 0.25 g of the pellet was dried, dissolved in 10 ml of methylene chloride, added with 40 μL of triethylamine, and permeated and reacted with 0.04 g of anthraquinone carboxylic acid anhydride at room temperature. After that, the reaction product was washed with water to remove excess anthraquinone carboxylic acid anhydride. Subsequently, methylene chloride was removed from the organic layer and the resulting solid was subjected to GPC analysis using the GPC system (i.e., Shodex GPC system-11 manufactured by Showa Denko K.K.) that is equipped with a UV detector (UV wavelength: 325 nm). Based on one-point calibration curve method established by using a sample with known terminal OH concentration, peak area was obtained, and then the OH concentration was calculated from the peak area.

2) Molecular Weight Mw:

The pellet was dissolved in THF, and the relative molecular weight in terms of polystyrene was measured by using the GPC system (i.e., Shodex GPC system-11 manufactured by Showa Denko K.K.).

3) Refractive Index:

The pellet was press-molded into a rectangular solid having 3 mm (thickness)×8 mm×8 mm and then its refractive index was measured using the refractometer manufactured by ATAGO Co.

4) Glass Transition Temperature (Tg):

Using a differential scanning calorimeter (i.e., SSC-5200 manufactured by Seiko Instruments), DSC measurement of the obtained pellet was carried out at the rate of 10° C./min.

5) Birefringence:

The pellet was dried for 24 hours under vacuum at 100° C. Then, the birefringence of a biconvex lens having a diameter of 7.9 mm obtained by injection molding under the condition including cylinder temperature of 250° C. and the mold temperature of 120° C. was measured using an ellipsometer manufactured by JASCO Corporation.

6) Total Light Transmittance Ratio:

The pellet was press-molded into a rectangular parallelepiped having 3 mm (thickness)×8 mm×8 mm. Then, the total light transmission ratio of the resulting molded product was measured using an instrument for detecting total light transmittance (i.e., Model 1001 DP manufactured by Nihon Denshoku Kogyo KK).

7) MFR:

According to JISK7210, MFR of the pellet was measured using the melt indexer T-111 (manufactured by Toyo Seiki Seisaku-Sho Ltd.) under the condition of orifice size of 2 mm, temperature of 260° C., and load of 2160 g.

TABLE 1

| | Concentration of terminal OH (ppm) | Molar incorporation ratio | Mw | Refractive index $n_D$ | Tg (° C.) | Birefringence (nm) | Total light transmittance ratio (%) | MFR (g/10 min) |
|---|---|---|---|---|---|---|---|---|
| Example 1 | 3800 | 0.945 | 21000 | 1.6413 | 155 | 44 | 90 | 65 |
| Example 2 | 3000 | 0.951 | 24000 | 1.6292 | 150 | 52 | 90 | 25 |
| Example 3 | 1300 | 0.983 | 38600 | 1.6403 | 154 | 59 | 89 | 10 |
| Comparative Example 1 | 580 | 1.05 | 23000 | 1.6227 | 139 | 63 | 90 | 31 |
| Comparative Example 2 | 280 | 1.054 | 33300 | 1.5830 | 148 | 1300 | 89 | 33 |

From the results shown in the Table 1, it was found that the polycarbonate resin compositions of the Example 1 to 3 have higher refractive index, higher resistance to heat, lower birefringence and higher transparency compared to the polycarbonate resin compositions of the Comparative Example 1 and 2. In particular, the polycarbonate resin compositions of the Example 1 and Example 3 have refractive index of more than 1.64, which cannot be obtained with the existing resin materials for small lens that are already commercially available. Thus, it was found that the polycarbonate resin compositions are very useful for the use in optical materials, in particular optical lens.

From the above, it was verified that the polycarbonate resin composition of the present invention has high refractive index, high resistance to heat, low birefringence and high transparency.

INDUSTRIAL APPLICABILITY

As the polycarbonate resin composition of the present invention has high refractive index, high resistance to heat, low birefringence and high transparency, it can be suitably used as an optical material such as lens, film and the like.

What is claimed is:

1. A polycarbonate resin composition which comprises a polycarbonate resin having the repeating unit that is represented by the following general formula (1) and a hydroxyl group at terminal thereof and has the concentration of the terminal hydroxyl group of 1000 to 4000 ppm, wherein the weight average molecular weight $M_w$ is from 10,000 to 40,000

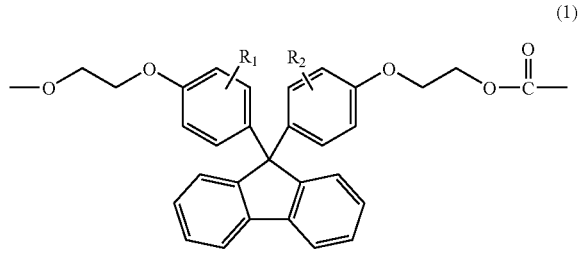

(1)

(wherein, $R_1$ and $R_2$ each independently represent a hydrogen atom or a methyl group).

2. The polycarbonate resin composition according to claim 1, characterized in that the weight average molecular weight $M_w$ is from 21,000 to 40,000.

3. A method of producing the polycarbonate resin composition of claim 1, comprising:

providing a carbonic acid ester compound and a dihydroxy compound represented by the following general formula (2), in which molar incorporation ratio of the carbonic acid ester compound relative to the dihydroxy compound is from 0.94 to 1.00; and subjecting the dihydroxy compound and the carbonic acid ester compound to melt polycondensation in the presence of a basic compound catalyst and an ester exchange catalyst or only one of them

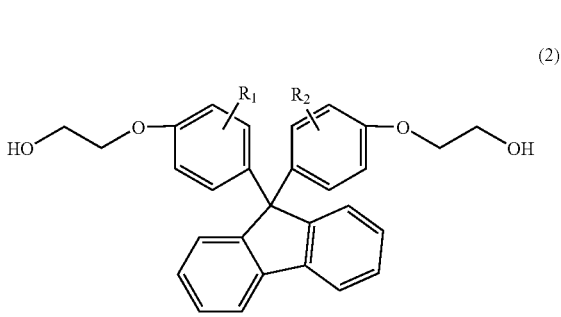

(2)

(wherein, $R_1$ and $R_2$ each independently represent a hydrogen atom or a methyl group).

4. An optical material comprising the polycarbonate resin composition according to claim 1.

5. A lens comprising the polycarbonate resin composition according to claim 1.

6. A film or a sheet comprising the polycarbonate resin composition according to claim 1.

7. A method of producing the polycarbonate resin composition of claim 2, comprising:

providing a carbonic acid ester compound and a dihydroxy compound represented by the following general formula (2), in which molar incorporation ratio of the carbonic acid ester compound relative to the dihydroxy compound is from 0.94 to 1.00; and subjecting the dihydroxy compound and the carbonic acid ester compound to melt polycondensation in the presence of a basic compound catalyst and an ester exchange catalyst or only one of them

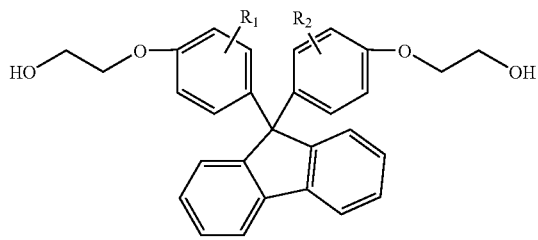

(2)

(wherein, $R_1$ and $R_2$ each independently represent a hydrogen atom or a methyl group).

8. An optical material comprising the polycarbonate resin composition according to claim 2.

9. A lens comprising the polycarbonate resin composition according to claim 2.

10. A film or a sheet comprising the polycarbonate resin composition according to claim 2.

11. The polycarbonate resin composition according to claim 1, wherein the weight average molecular weight $M_w$ is from 21,000 to 386,000.

12. The method of producing the polycarbonate resin composition according to claim 3, wherein the molar incorporation ratio is from 0.945 to 0.983.

13. The method of producing the polycarbonate resin composition according to claim 7, wherein the molar incorporation ratio is from 0.945 to 0.983.

14. The polycarbonate resin composition according to claim 1, having the concentration of the terminal hydroxyl group 3000 to 4000 ppm.

* * * * *